(12) United States Patent
Tang et al.

(10) Patent No.: US 11,546,861 B2
(45) Date of Patent: Jan. 3, 2023

(54) TECHNIQUES IN INTER-BAND AND INTRA-BAND DYNAMIC POWER SHARING IN DUAL CONNECTIVITY COMMUNICATIONS

(71) Applicant: Apple Inc., Cupertino, CA (US)

(72) Inventors: Yang Tang, San Jose, CA (US); Tao Xu, Portland, OR (US); Jiwoo Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/273,122

(22) PCT Filed: Sep. 5, 2019

(86) PCT No.: PCT/US2019/049674
§ 371 (c)(1),
(2) Date: Mar. 3, 2021

(87) PCT Pub. No.: WO2020/051286
PCT Pub. Date: Mar. 12, 2020

(65) Prior Publication Data
US 2021/0227475 A1    Jul. 22, 2021

Related U.S. Application Data

(60) Provisional application No. 62/728,653, filed on Sep. 7, 2018.

(51) Int. Cl.
*H04W 52/14* (2009.01)
*H04W 76/15* (2018.01)
(Continued)

(52) U.S. Cl.
CPC ......... *H04W 52/146* (2013.01); *H04W 52/16* (2013.01); *H04W 52/247* (2013.01);
(Continued)

(58) Field of Classification Search
CPC ... H04W 52/146; H04W 76/15; H04W 52/16; H04W 52/247; H04W 52/346; H04W 52/50; H04W 72/14; H04W 88/06
See application file for complete search history.

(56) References Cited

U.S. PATENT DOCUMENTS

| | | | |
|---|---|---|---|
| 2016/0255593 A1* | 9/2016 | Blankenship | H04L 5/0003 370/328 |
| 2020/0053724 A1* | 2/2020 | MolavianJazi | H04W 72/10 |
| 2021/0204227 A1* | 7/2021 | Bergljung | H04W 52/365 |

OTHER PUBLICATIONS

Mediatek Inc: "MPR and A-MPR considerations for EN-DC UE," 3GPP Draft; R1-1809730, 3GPP TSG RAN WG1, No. 94, Gothenburg, Sweden; Aug. 20, 2018-Aug. 24, 2018 Aug. 21, 2018 (Aug. 21, 2018), XP051517091, 4 pages.
(Continued)

*Primary Examiner* — John J Lee
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for determining dynamic power sharing in a dual-uplink E-UTRA (Evolved Universal Terrestrial Radio Access)—new radio dual connectivity (EN-DC) network, and/or other new radio (NR) related networks. Various embodiments describe how to determine or configure respective transmission (TX) power levels for LTE and NR uplink signals in the dual-uplink EN-DC network. The NR uplink signal may or may not be transmitted based on a certain timeline threshold and/or power scaling threshold. Other embodiments may be described and claimed.

20 Claims, 8 Drawing Sheets

(51) Int. Cl.
*H04W 52/16* (2009.01)
*H04W 52/24* (2009.01)
*H04W 52/34* (2009.01)
*H04W 52/50* (2009.01)
*H04W 72/14* (2009.01)
*H04W 88/06* (2009.01)

(52) U.S. Cl.
CPC ......... *H04W 52/346* (2013.01); *H04W 52/50* (2013.01); *H04W 72/14* (2013.01); *H04W 76/15* (2018.02); *H04W 88/06* (2013.01)

(56) References Cited

OTHER PUBLICATIONS

Qualcomm: "Maintenance for NR-LTE co-existence," 3GPP Draft; R1-1809431 3GPP TSG RAN WG1, No. 94, Gothenburg, Sweden; Aug. 20, 2018-Aug. 24, 2018 Aug. 11, 2018 (Aug. 11, 2018), XP051516794, 16 pages.

Qualcomm Incorporated, "PCMAX for intra-band EN-DC," 3GPP Draft; R4-1811251, 3GPP TSG-RAN WG4, No. 88, Gothenburg, SE; Aug. 20, 2018-Aug. 24, 2018 Aug. 10, 2018 (Aug. 10, 2018), XP051580158, 3 pages.

International Search Report and Written Opinion of the International Searching Authority directed to related International Patent Application No. PCT/US2019/049674, dated Dec. 20, 2019, 10 pages.

Huawei et al., "Remaining details of UL power control design", R1-1801462, 3GPP TSG RAN WG1 #92, Athens, Greece, Feb. 16, 2018, 14 pages.

Interdigital Inc., "Timing and Asynchronous Transmissions with Power Control for NR DC", R1-1806966, 3GPP TSG RAN WG1 #93, Busan, Korea, May 11, 2018, 3 pages.

Samsung, "Summary of NR UL power control—CA aspects", R1-1805571, 3GPP TSG RAN WG1 #92bis, Sanya, China, Apr. 19, 2018, 10 pages.

ZTE, "Summary for A1 7.1.5 NR UL power control in non-CA aspects", R1-1809772, 3GPP TSG RAN WG1 #94, Gothenburg, Sweden, Aug. 22, 2018, 30 pages.

* cited by examiner

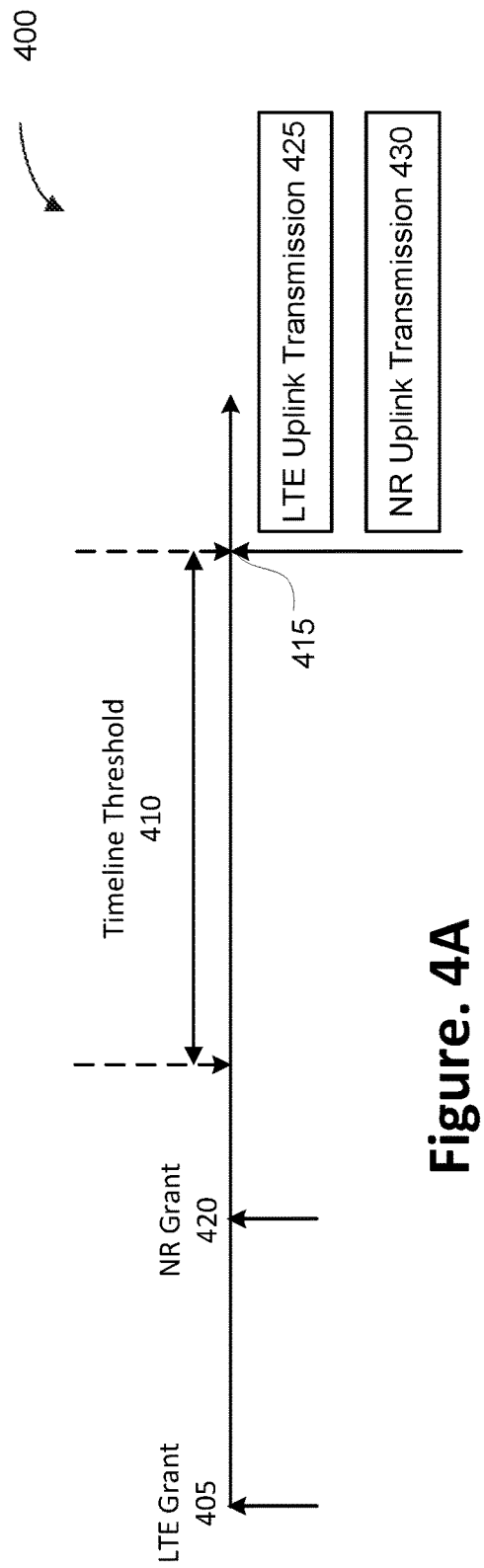
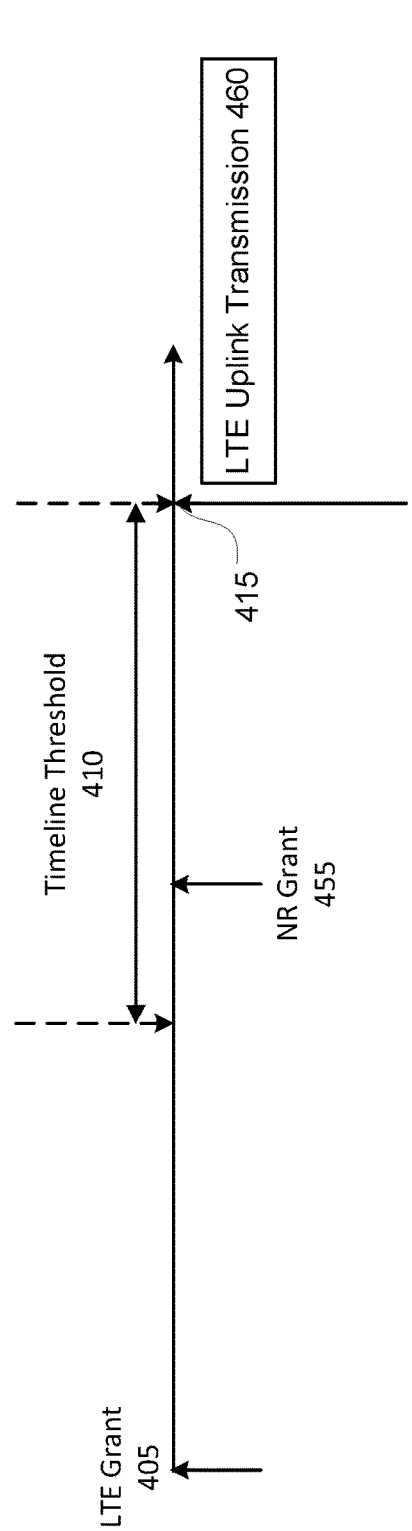
Figure. 4A
Figure. 4B

TECHNIQUES IN INTER-BAND AND INTRA-BAND DYNAMIC POWER SHARING IN DUAL CONNECTIVITY COMMUNICATIONS

CROSS REFERENCE TO RELATED APPLICATION

The present application is a U.S. National Phase of International Application No. PCT/US2019/049674, filed Sep. 5, 2019, which claims priority to U.S. Provisional Patent Application No. 62/728,653, filed Sep. 7, 2018, entitled "EN-DC Inter-band and Intra-band Dynamic Power Sharing," the entire disclosures of which are hereby incorporated by reference in their entirety.

The present application claims priority to U.S. Provisional Patent Application No. 62/728,653, filed Sep. 7, 2018, entitled "EN-DC Inter-band and Intra-band Dynamic Power Sharing," the entire disclosure of which is hereby incorporated by reference in its entirety.

FIELD

Embodiments of the present invention relate generally to the technical field of wireless communications.

BACKGROUND

The background description generally presents the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

The Fifth Generation (5G) new radio (NR) may be implemented in Non-Standalone (NSA) networks that incorporate both long term evolution (LTE) and NR, for example, E-UTRA (Evolved Universal Terrestrial Radio Access)—NR Dual Connectivity (EN-DC) networks, and NR—E-UTRA Dual Connectivity (NE-DC) networks. In a dual-uplink EN-DC network, both NR and LTE are allowed to transmit data simultaneously to boost uplink throughput and improve network efficiency. However, one of the challenges is how to determine the transmission powers for NR and LTE signals in order to fulfill all the transmission related requirements while providing sufficient performance. Thus, a conventional equal power sharing between the LTE and NR, or power configuration based on single-uplink operations, may not be sufficient and may sacrifice performance while facing an increasingly complex dual-uplink EN-DC network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 4A/4B illustrate examples of dual-uplink transmission procedures, in accordance with various embodiments.

DETAILED DESCRIPTION

Figure 1:
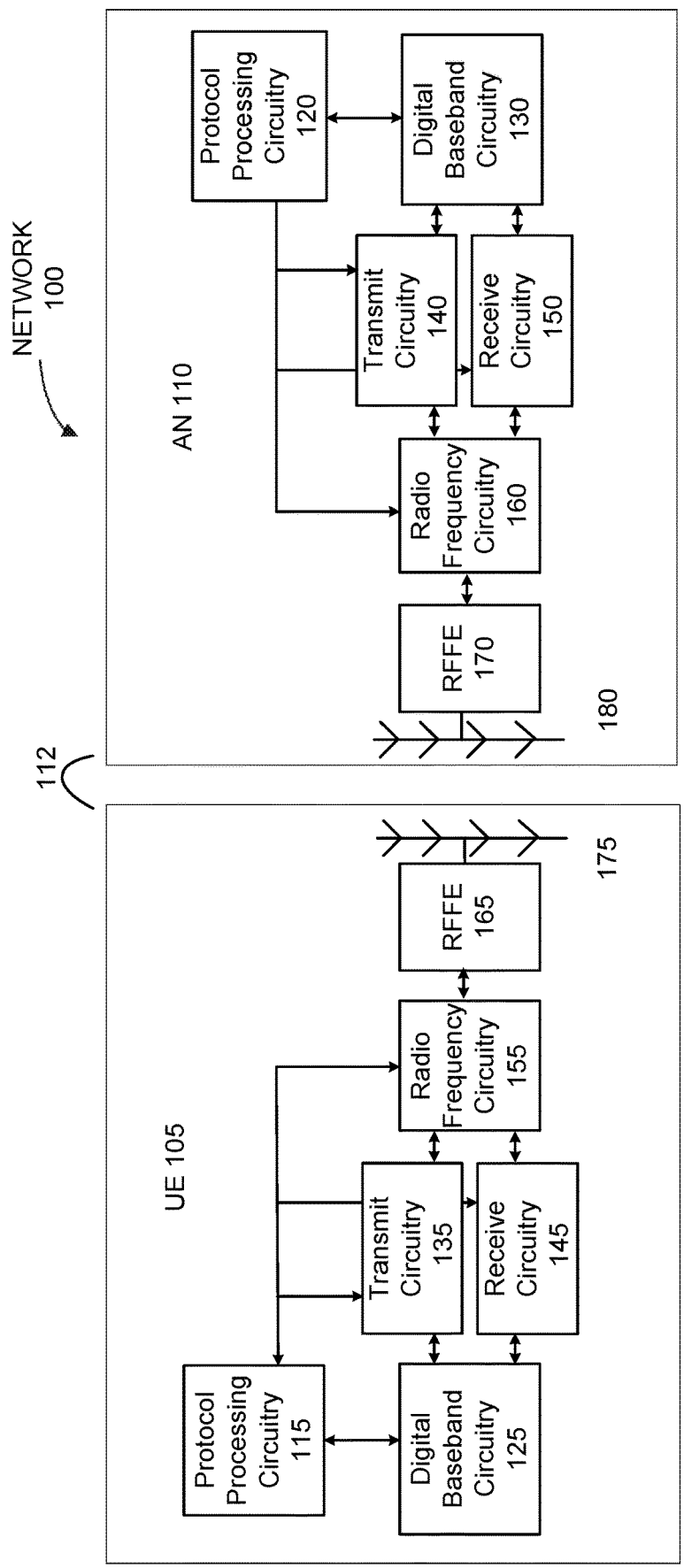
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The terms "coupled," "electronically coupled," "communicatively coupled," "connected," "electronically connected," "communicatively connected," along with derivatives thereof are used herein. The term "coupled" and/or "connected" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" and/or "directly connected" may mean that two or more elements are in direct contact with one another. The term "electronically coupled" and/or "electronically connected" may mean that two or more elements may be in contact with one another by a means of circuitry including through one or more vias, traces, wires, wire-bonds, or other interconnect connections, through a wireless communication channel or link, and/or the like.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

There are various bands below 6 GHz in 4G LTE and 5G NR. In NR, frequency range 1 (FR1) overlaps and extends 4G LTE frequencies, including various bands from 450 MHz to 6,000 MHz, which is commonly referred to as NR sub-6 GHz. NR further includes a frequency range 2 (FR2) covering from 24,250 MHz to 52,600 MHz, which is commonly referred to as mmWave, even though the millimeter wave frequency may start at 30 GHz strictly speaking. Herein, the pairs of FR1/FR2 and sub-6 GHz (below 6 GHz)/mmWave are used interchangeably.

Multi-Radio Access Technology (RAT) Dual Connectivity (MR-DC) may involve a multiple reception (Rx)/transmission (Tx) UE that may be configured to utilize radio resources provided by two distinct schedulers in two different nodes connected via non-ideal backhaul, one providing Evolved Universal Terrestrial Radio Access (E-UTRA) access and the other one providing NR access. One scheduler is located in a Master Node (MN) and the other in the Secondary Node (SN). The MN and SN are connected via a network interface and at least the MN is connected to the core network.

MR-DC may include, but is not limited to, E-UTRA—NR Dual Connectivity (EN-DC), NG-RAN—E-UTRA-NR Dual Connectivity (NGEN-DC), and NR—E-UTRA Dual Connectivity (NE-DC). In an EN-DC network or communication, a UE may be connected to one evolved NodeB (eNB) or ng-eNB that acts as a master node (MN) and one next generation NodeB (gNB) that acts as a secondary node (SN). An ng-eNB may be an enhanced eNodeB that connects to the 5G Core network via the next generation (NG) interfaces but still uses LTE air interfaces to communicate with a 5G UE. So, both the gNB and ng-eNB use the new NG interfaces toward the 5G Core but use different radio interfaces towards the UE. Note that "eNB" may be used to indicate an eNB and/or ng-eNB, in embodiments herein. The eNB or ng-eNB is connected to an evolved packet core (EPC) and the gNB is connected to the eNB. The gNB may be a node that provides NR user-plane and control-plane protocol terminations towards the UE, and acts as the SN in an EN-DC. In an NE-DC network or communication, by contrast, a UE may be connected to one gNB that acts as an MN and one eNB or ng-eNB that acts as an SN. The gNB is connected to 5G Core (5GC) and the eNB or ng-eNB is connected to the gNB via the Xn interface.

In a dual-uplink EN-DC or similar communications, one or more LTE uplink signals and one or more NR uplink signals may be transmitted in an intra-band or inter-band EN-DC operation. To simplify descriptions in this disclosure, only one LTE signal and one NR signal may be used in various embodiments herein. However, the various embodiments herein may be applicable to more than one LTE uplink signal and/or NR uplink signal. In a dynamic power sharing (DPS) dual-uplink EN-DC, a transmission (TX) power of an LTE uplink and a TX power of an NR uplink may be determined jointly and dynamically in accordance with certain transmitting requirements for a UE. Current solutions may have some drawbacks in some aspects.

In one example solution, a UE may be granted to transmit one LTE signal and one NR signal simultaneously in a dual-uplink EN-DC operation. To determine respective transmission power levels for the two uplinks, the UE may follow an example procedure as follows:

The UE calculates LTE power (P_LTE_only) considering no NR Tx

The UE calculates NR power (P_NR_only) considering no LTE Tx

The UE calculates the LTE power (P_L) and NR power (P_N) according to the dynamic power sharing rule and maximum power reduction (MPR) and/or additional MPR (A-MPR)

The UE performs the following:

If both P_LTE_only==P_L && P_NR_only==P_N, then UE transmits LTE and NR at powers P_L and P_N, respectively;

Else, the UE chooses a new P_N' power within the bounds $0 \leq P\_N' < P\_N$, and the UE determines LTE power P_L' based on P_N'.

If P_N'==0, then P_L'=P_LTE_only;

else if P_N'==P_N, then P_L'=P_L;

else P_L<P_L'<P_LTE_only.

The UE transmits LTE and NR at power levels P_L' and P_N', respectively.

However, the UE may not be able to determine a proper P-N', nor corresponding P_L' with this solution, if the UE needs to determine new P_N' and P_L' due to the situation that the respective transmission (TX) powers for the LTE and NR uplink signals cannot be held at those levels in dual-uplink operations.

In another example solution, the LTE power is similarly calculated while considering no NR uplink, and the LTE power is not changeable if an NR signal is to be transmitted due to an NR grant reception. A corresponding power level for the NR signal may be calculated based on the calculated LTE power. The NR power may be scaled down due to certain transmitting requirements while the UE is in the dual uplink mode. For example, an NR/LTE uplink co-existence may cause intermodulation distortion (IMD) and require further MPR and/or A-MPR. In this solution, the UE may determine not to enable or transmit the NR uplink signal if the power reduction is more than a certain threshold. However, the LTE power is not adjustable and may compromise the NR performance due to the NR power reduction. This may compromise the overall uplink performance of LTE and NR uplinks together.

In addition, neither solutions concern any timing related issues. For example, the UE may require more time to calculate and determine the TX power for the LTE uplink signal, whereas the UE may require less time to calculate and determine the TX power for the NR uplink signal. Thus, when a procedure of determining the LTE TX power starts, the UE may not be able to recalculate the LTE TX power to accommodate the NR uplink if an NR grant arrives at the UE later in time. But if the NR grant arrives within a certain time limit, the UE may be able to recalculate the LTE TX power under the consideration of LTE and NR dual uplinks. Hence, the overall dual-uplink performance may benefit from recalculating the TX powers. Note that "uplink power" and "TX power" are used interchangeably throughout this disclosure.

An NR or LTE signal may refer to an NR or LTE uplink signal herein, unless otherwise indicated.

Embodiments described herein may include, for example, apparatuses, methods, and storage media for configuring and implementing dynamic power sharing (DPS) in, or related to, LTE/NR-related networks from perspectives of both UEs and networks. Various embodiments may be directed to configurations or determinations of DPS in dual-uplink EN-DC. The various embodiments may be applicable to like LTE and NR dual connectivity operations. Such approaches may facilitate optimizations in dual-uplink performance for better throughput.

FIG. 1 schematically illustrates an example wireless network 100 (hereinafter "network 100") in accordance with various embodiments herein. The network 100 may include a UE 105 in wireless communication with an AN 110. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), next-generation eNB (ng-eNB), next-generation NodeB (gNB or ng-gNB), NG-RAN node, cell, serving cell, neighbor cell, primary cell (PCell), secondary cell (SCell), primary SCell (PSCell), and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio resource control (c), radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry shown in FIGS. 3A and 3B. The UE 105 may include protocol processing circuitry 115, which may implement one or more layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
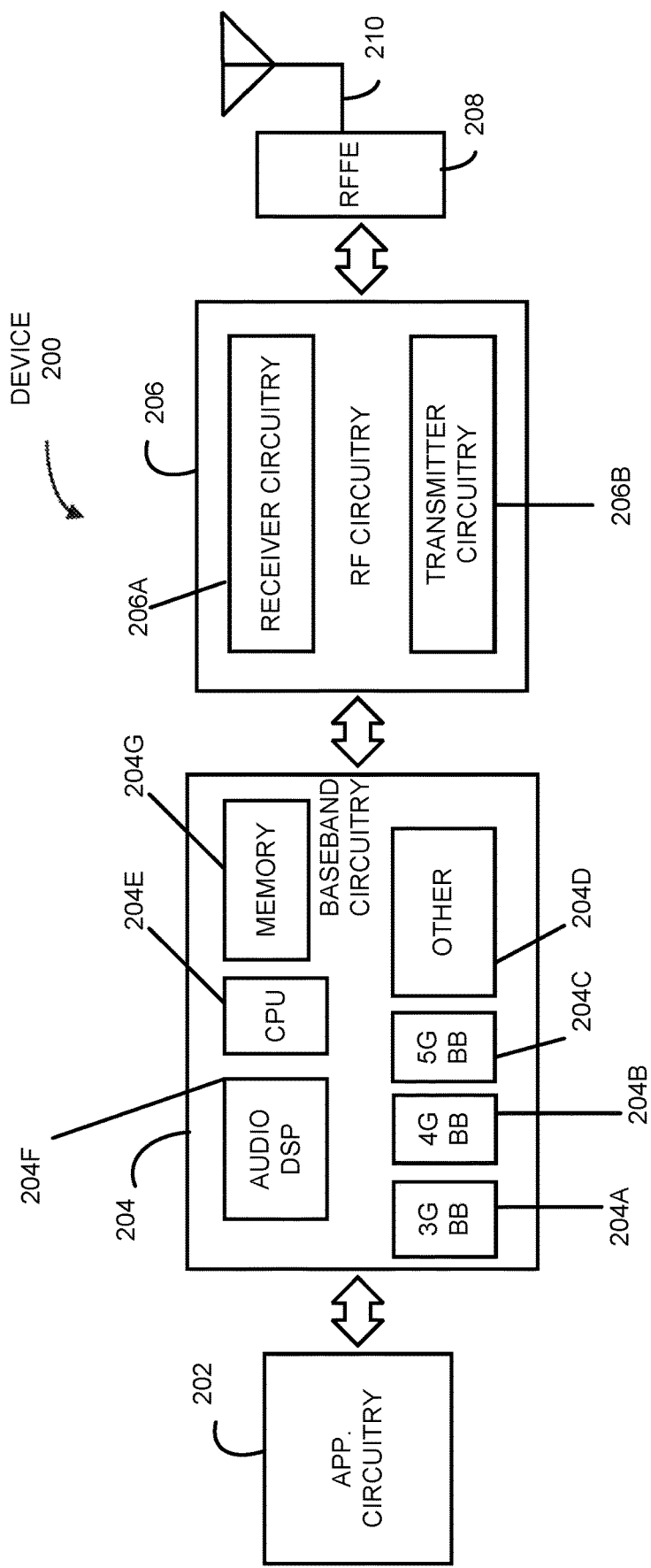
FIG. 2 illustrates example components of a device in accordance with various embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3A/3B, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

Figure 3:
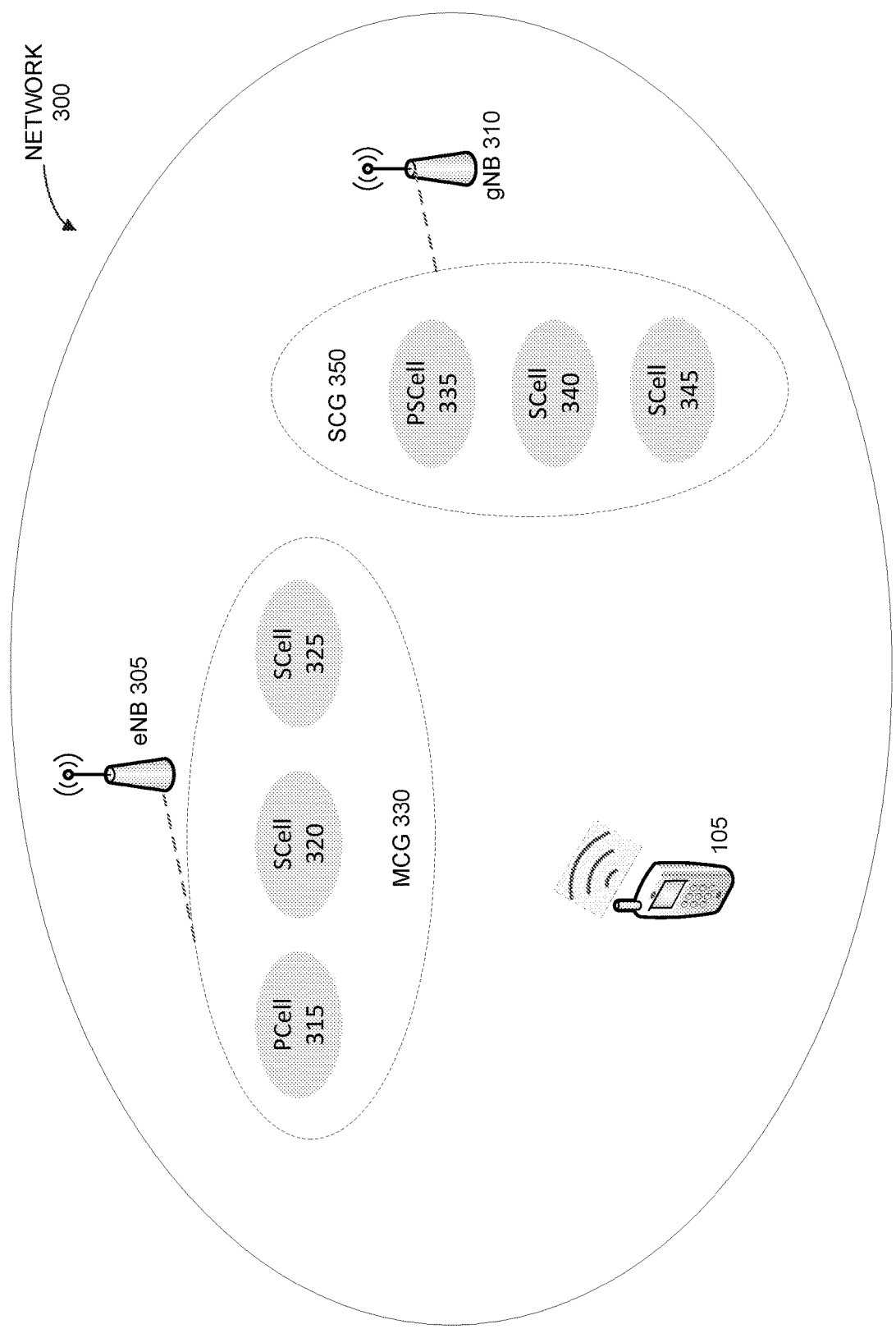
FIG. 3 illustrates an example dual-uplink configuration and operation in an EN-DC network, according to various embodiments.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam. FIG. 3 further illustrates details regarding the RFFE 170 and antenna panel 180.

The AN 110 may generate and transmit a message to include a measurement gap configuration according to various embodiments herein. The UE 105 may decode the message transmitted by the AN 100 to determine a starting point of the configured measurement gap, according to various embodiments herein.

FIG. 2 illustrates example components of a device 200 in accordance with some embodiments. In contrast to FIG. 1, FIG. 2 illustrates example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, a cell may not utilize the application circuitry 202, and instead include a processor/controller to process IP data received from an EPC). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) and/or NR baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

FIG. 3 illustrates an example EN-DC network 300. The network 300 may include multiple ANs, for example, eNB 305 and gNB 310. The eNB 305 and gNB 310 may be the same or substantially similar to the AN 110 in FIG. 1. The eNB 305 may provide or be associated with a Primary Serving Cell (PCell) 315 of the UE 105. The eNB 305 may further provide or be associated with one or more Secondary Cells (SCells), for example, 320 and 325. The PCell 315 and SCells 320/325 may be part of a Master Cell Group (MCG) 330 of the UE 105.

In some embodiments, the gNB 310 may provide or be associated with a Primary Secondary Serving Cell (PSCell) 335 of the UE 105. The gNB 310 may further provide one or more SCells, e.g., 340 and 345. The PSCell 335 and SCells 340/345 may be part of a Secondary Cell Group (SCG) 350 of the UE 105. Note that "AN of the PCell," "AN in the PCell," and "PCell" are used interchangeably throughout the disclosure herein, as well as regarding the terms of PSCell, SCell, etc.

In a single-uplink operation (SUO) in EN-DC, the UE 105 may receive an LTE grant so that an LTE uplink may be generated and transmitted by the UE 105. The LTE uplink power level may be calculated by the UE 105 based on the network condition, and this LTE TX power level may be referred as P_LTE_only. The network condition may consider various aspects of the UE/AN network when calculating an adequate LTE TX power. For example, the location of the UE, path lass, corresponding MPR/A-MPR, etc. Similarly, if the UE 105 receives an NR grant so that an NR uplink may be generated and transmitted by the UE 105 in the SUO. The NR uplink power level may be calculated by the UE 105 based on the network condition, and this NR TX power level may be referred as P_NR_only.

By contrast, in a dual-uplink EN-DC operation, the UE 105 may receive an LTE grant and an NR grant for respective LTE and NR uplinks, from the eNB 305. In this way, the UE 105 may transmit both an LTE uplink and an NR uplink simultaneously. Note that more than one LTE uplink and/or NR uplink may be transmitted in a dual-uplink EN-DC operation, but only one LTE uplink and one NR uplink are used in various embodiments herein for the sake of simplicity. Due to various power transmission limitations and requirements, either or both of the LTE and NR uplinks may not transmit at the power levels while in the SUO operation. Thus, P_LTE_only and/or P_NR_only may not be applicable in dual-uplink operation and respective TX powers may need reconsideration. Such reconsideration may calculate the TX powers according to certain TX requirements. The TX requirements may include, but are not limited to, UE maximum output power based on its power class, MPR, A-MPR, spectrum emissions, transmit intermodulation, and other transmit qualities. Some or all of the TX requirements may be considered under dual-uplink operations, based on corresponding carrier frequencies and/or band combinations. Depending on the interferences and IMDs between the two uplinks, respective TX powers for LTE and NR uplinks may be equal to or reduced from the corresponding SUO TX powers, P_LTE_only and/or P_NR_only. Thus, new TX power levels, P_LTE_dual and/or P_NR_dual, may be calculated and used for a dual-uplink EN-DC transmission.

In embodiments, the UE 105 may need a much longer time to calculate the LTE TX power than the NR TX power, due to several reasons behind the two technologies. Thus, the time to calculate and configure NR TX power is negligible for the purpose of this discussion. In order to transmit an uplink signal at a certain scheduled time, the UE 105 may need to begin to calculate and/or configure the LTE TX power at least a certain time prior to the scheduled transmission. Otherwise, the UE 105 may not have sufficient time to determine the LTE TX power. Such a minimum time prior to the TX transmission may be referred to as a timeline threshold. In some scenarios, when the UE 105 receives the LTE grant first and the NR grant later than the LTE grant, the UE 105 may not start to calculate the P_LTE_dual and/or P_NR_dual until receiving the NR grant. If the NR grant is received much later then the LTE grant or is received too close to the scheduled LTE transmission time, the UE 105 may not be able to calculate the P_LTE_dual and/or P_NR_dual in time for the scheduled TX transmission. Various embodiments herein provide solutions to encounter this issue or minimize the potential impact.

FIG. 4A illustrates an example of dual-uplink transmission procedure 400, in accordance with various embodiments. In embodiments, the UE 105 may begin a procedure to generate the LTE uplink signal upon receiving the LTE grant 405. The UE 105 may need at least a minimum time to determine the TX power for LTE uplink in this procedure. Such a minimum time for the UE 105 to determine the LTE TX power may be referred to as a timeline threshold 410. Then the UE 105 may start to transmit uplink signals at a scheduled time 415. Note that the UE 105 may need a relatively longer time to calculate an LTE TX power than to calculate an NR TX power, and the time to calculate the NR TX power is neglected for the purpose of this discussion. If the UE has been calculating the LTE TX power and an NR grant 420 for NR uplink transmission is received later by the UE 105, the UE 105 may recalculate the LTE TX power and calculate the NR TX power together with the LTE TX power re-calculation. Since the NR grant 420 is received sufficiently early to allow the UE 105 to recalculate the TX power for LTE uplink, the UE 105 may transmit both the LTE and NR uplinks 425 and 430 at their proper power levels, P_LTE_dual and P_NR_dual. Note that the P_LTE_dual and/or P_NR_dual may hold the same values as the P_LTE_only and/or P_NR_only, as long as all the pertinent TX requirements are satisfied.

In embodiments, the UE 105 may compare the TX powers between the P_NR_only and P_NR_dual. If the P_NR_dual is reduced more than a certain threshold, the UE 105 may determine to drop the NR uplink completely. Otherwise, a relatively low NR TX power may negatively affect the overall UE performance in terms of throughput and/or other performance. A power scaling threshold X may be used in determining whether a reduction in NR uplink TX power is too large to keep the NR uplink transmission. In some embodiments, if the difference between the P_NR_only and P_NR_dual is larger than the power scaling threshold X, this may mean the TX power of the NR uplink is reduced, due to DPS, to a level that acceptable NR uplink performance may not be achievable any more. Then the UE 105 may be allowed to drop such an NR uplink transmission and only keep the LTE uplink transmission at its LTE TX power under SUO, P_LTE_only. By contrast, if the power reduction from the P_NR_only to P_NR_dual is not larger than the power scaling threshold X, the UE 105 may generate both the LTE and NR uplinks at their respective TX power levels, P_LTE_dual and P_NR_dual.

In embodiments, the power scaling threshold X may be measured in decibel (dB) to indicate a difference between two power levels. The power scaling threshold X in dB may also be used to indicate a power spectral density (PSD) difference in dB/Hz. This is because the same bandwidth of the NR uplink signal is used in calculating the P_NR_only to P_NR_dual for a granted NR uplink. The power scaling threshold X may be a constant or a variable.

FIG. 4B illustrates an example of dual-uplink transmission procedure 450, in accordance with various embodiments. In this example, the NR grant 455 is received by the UE 105 at a later time that is within the timeline threshold 410. Since the UE 105 may have to abort the ongoing LTE TX power calculation and start with a new one in consideration of both the LTE and NR uplinks, the UE 105 may not have sufficient time to complete the LTE TX power determination to transmit both the LTE and NR uplink at the scheduled time 415. Thus, the UE 105 may determine not to abort the ongoing LTE TX power determination and transmit the calculated LTE TX power at P_LTE_only at the scheduled time 415. The NR uplink may not be considered and generated even with the NR grant reception. Thus, if the UE 105 receives the NR grant 455 later than the timeline threshold 410, the UE 105 may drop the NR uplink but only calculate the LTE TX power at P_LTE_only and transmit the LTE uplink at the scheduled time 415 for LTE transmission 460 only.

In some embodiments, the timeline threshold 410 may be defined or measured based on a number of subframes, slots, or frames of LTE and/or NR. Alternatively or additionally, the timeline threshold 410 may be defined or measured in time, such as seconds, milliseconds, etc. The timeline threshold 410 may be defined as an absolute or a relative value. Any combination thereof may be used in defining the timeline threshold 410.

Figure 5A:
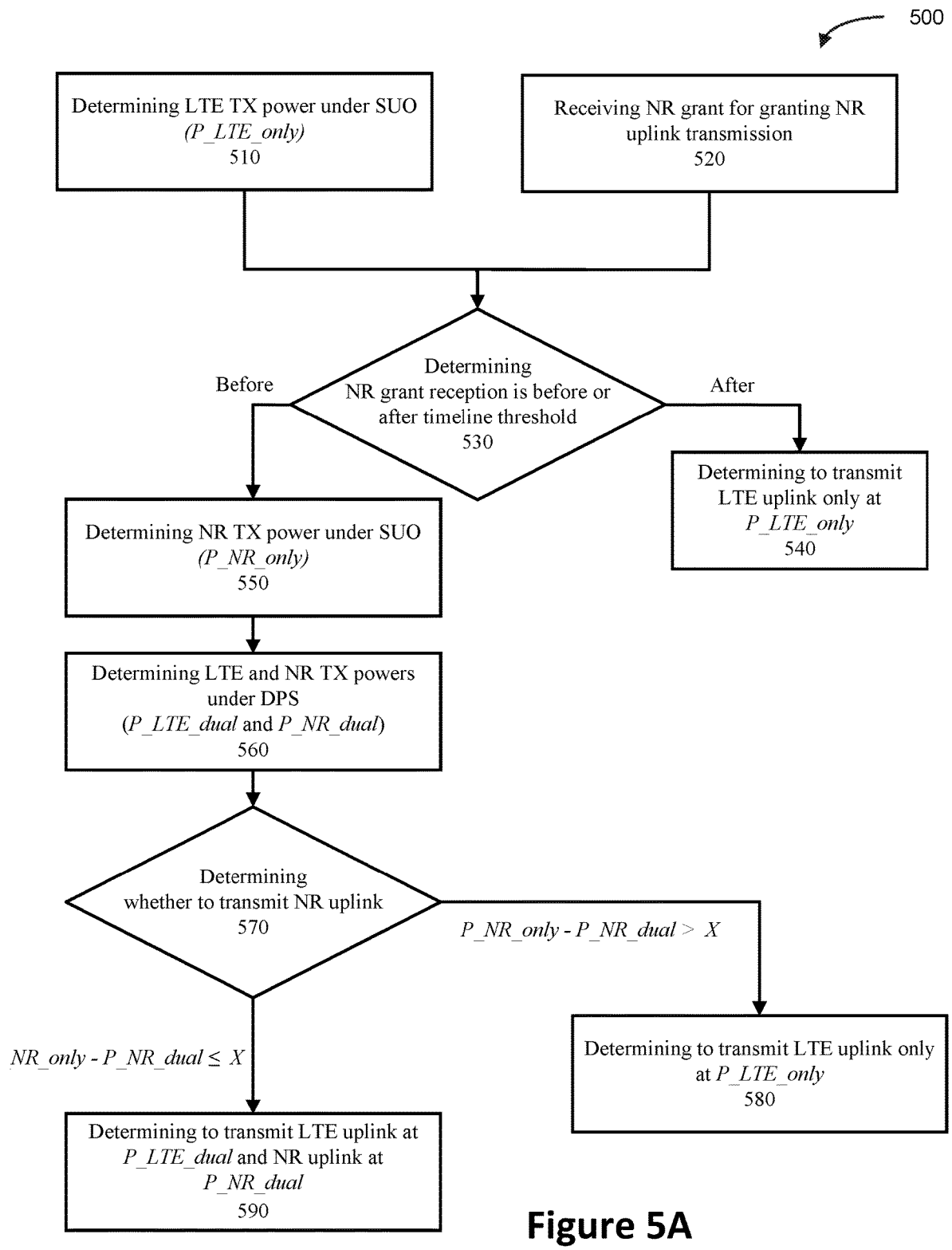
FIG. 5A illustrates an operation flow/algorithmic structure to facilitate a process of dynamic power sharing (DPS) in a dual-uplink EN-DC by a UE, in accordance with various embodiments.

FIG. 5A illustrates an operation flow/algorithmic structure 500 to facilitate a process of determining DPS in dual-uplink EN-DC operations by the UE 105, in accordance with various embodiments as illustrated with respect to FIGS. 4A and 4B. The operation flow/algorithmic structure 500 may be performed by the UE 105 or circuitry thereof.

The operation flow/algorithmic structure 500 may include, at 520, receiving an NR grant for granting the NR uplink transmission in the dual-uplink EN-DC network. The reception of the NR grant may occur prior to or within a timeline threshold. The timeline threshold may be the same as or substantially similar to the timeline threshold 410 with respect to FIGS. 4A/B. The timeline threshold may be predetermined or determined by the UE 105. The timeline threshold may be indicated or configured by the network.

The operation flow/algorithmic structure 500 may include, at 520, receiving an NR grant for granting the NR uplink transmission in the dual-uplink EN-DC network. The reception of the NR grant may occur prior to or within a timeline threshold. The timeline threshold may be the same as or substantially similar to the timeline 410 with respect to FIGS. 4A/B. The timeline threshold may be predetermined or determined by the UE 105. The timeline threshold may be indicated or configured by the network.

In embodiments, the UE 105 may determine the timeline threshold and a power scaling threshold to be used in DPS between the LTE and NR uplinks in the EN-DC network. The power scaling threshold may be predetermined or determined by the UE 105. The power scaling threshold may be indicated or configured by the network.

The operation flow/algorithmic structure 500 may include, at 530, determining whether the NR grant is received before or after the timeline threshold. The timeline threshold is the same as or substantially similar to the timeline threshold 410 with respect to FIGS. 4A and 4B. If it is determined that the NR grant is received after or within the timeline threshold, the UE 105 may operate at 540. Otherwise, if it is determined that the NR grant is received prior to the timeline threshold, the UE 105 may operate at 550-570.

The operation flow/algorithmic structure 500 may include, at 540, determining to transmit LTE uplink only at P_LTE_only. In this scenario, the NR uplink may not be considered since the NR grant is not received in time for the UE 105 to recalculate and configure the LTE uplink for the scheduled LTE uplink transmission. Thus, the UE 105 may be allowed to drop the NR uplink. In this way, only the LTE uplink may be transmitted at the original power level of P_LTE_only. Therefore, NR uplink can be dropped even with the reception of the NR grant.

The operation flow/algorithmic structure 500 may include, at 550, determining an NR TX power under SUO in the EN-DC network. The determined LTE TX power of SUO may be referred to as P_NR_only. Such a determination may consider various TX requirements according to the condition of the transmission path between the UE 105 and the corresponding AN. The determination of the NR TX power of an NR uplink transmission under SUO may be based on particular transmission conditions with corresponding NR node of the network.

The operation flow/algorithmic structure 500 may include, at 560, determining an LTE TX power and NR TX power under DPS in the EN-DC network for dual uplinks. The determined LTE TX power under DPS may be referred to as P_LTE_dual and the determined NR TX power under DPS may be referred to as P_NR_dual. Such a determination may consider various TX requirements under respective operations 510 and 520 of SUO EN-DC network, and further consider interactions, interferences, and/or intermodulations between the LTE and NR uplinks. The P_LTE_dual and P_NR_dual may be reduced from the corresponding P_LTE_only and P_NR_only, due to certain DPS rules and/or MPR/A-MPR considerations. Sometimes, the P_LTE_dual and P_NR_dual may not be reduced, depending on the network conditions and/or band combinations. The considerations may apply to inter-band and intra-band EN-DC operations.

The operation flow/algorithmic structure 500 may include, at 570, determining transmissions of the LTE and NR uplinks under DPS in the dual-uplink EN-DC operation. In this scenario, the UE 105 may receive the NR grant in time to prepare for the LTE and NR uplinks. However, if the NR TX power would be reduced by more than a power scaling threshold X, the UE may determine or be allowed to drop the NR uplink, which is detailed in operation 580. The determination may be based on a comparison of the difference between the P_NR_only and P_NR_dual to the power scaling threshold X. The power scaling threshold X may be the same as or substantially similar to the power scaling threshold X described with respect to FIG. 4A. If the NR TX power would not be reduced by more than a power scaling threshold X, the UE may prepare for transmission of both the LTE and NR uplinks, which is detailed in operation 590.

The operation flow/algorithmic structure 500 may include, at 580, determining to transmit LTE uplink only at P_LTE_only. In this scenario, the NR uplink may not be considered since the NR TX power would be reduced by more than a power scaling threshold X. Thus, only the LTE uplink may be transmitted at the original power level of P_LTE_only. NR uplink may be dropped even with the reception of the NR grant. Alternatively, the UE 105 may be allowed to drop the NR uplink and the UE 105 may choose not to.

The operation flow/algorithmic structure 500 may include, at 590, determining to transmit both the LTE uplink and NR uplink at P_LTE_dual and P_NR_dual respectively, if the difference between the P_NR_only and P_NR_dual is less than or equal to the power scaling threshold X. In this scenario, the UE 105 may generate and/or configure both the LTE and NR uplinks accordingly.

In embodiments, the UE 105 may determine a new NR TX power P_NR_dual' while calculating the LTE and NR uplink powers under DPS. However, a difference between the P_NR_only and P_NR_dual' may also be calculated and compared with the power scaling threshold X. A similar procedure may be followed in accordance with operations 570/580/590.

In embodiments, the UE 105 may prepare for the transmission of both the LTE and NR dual uplinks or only LTE uplink based on the above-described procedure. The UE 105 may generate corresponding LTE uplink and/or NR uplink TX signals, and configure the signal(s) with determined power output power levels.

Figure 5B:
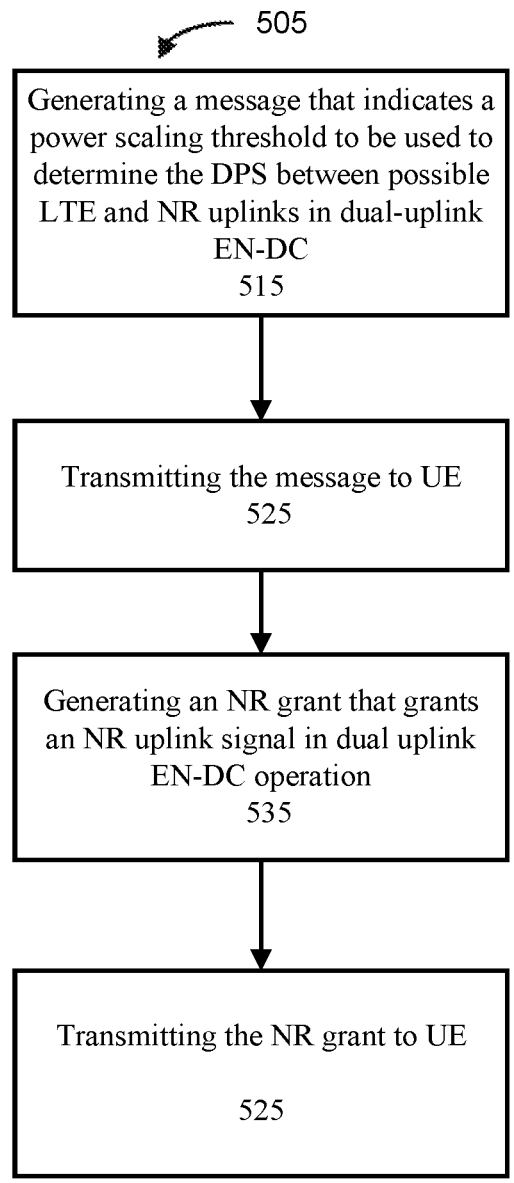
FIG. 5B illustrates an operation flow/algorithmic structure to facilitate the DPS in a dual-uplink EN-DC by an AN, in accordance with various embodiments.

FIG. 5B illustrates an operation flow/algorithmic structure 505 to facilitate the process of determining DPS in dual-uplink EN-DC operations by the AN 110, in accordance with various embodiments as illustrated with respect to FIGS. 4A and 4B. The AN 110 may be an eNB in the EN-DC mode. The operation flow/algorithmic structure 505 may be performed by the AN 110 or circuitry thereof.

The operation flow/algorithmic structure 505 may include, at 515, generating a message that indicates a power scaling threshold to be used to determine the DPS between possible LTE and NR uplinks in a dual-uplink EN-DC operation. The power scaling threshold may be the same as or substantially similar to the power scaling threshold X described with respect to FIG. 4A.

The operation flow/algorithmic structure 505 may include, at 525, transmitting the message to a UE. Such a transmission may be via RRC, certain high-level signaling, or like signaling.

The operation flow/algorithmic structure 505 may further include, at 535, generating an NR grant that grants an NR uplink signal in the dual uplink EN-DC operation. The NR grant may be generated upon a request for dual-uplink by the UE.

The operation flow/algorithmic structure 505 may further include, at 545, transmitting the NR grant to the UE. The NR grant may be transmitted to the UE at the same time or later than the time that the LTE grant is transmitted to the UE.

Figure 6:
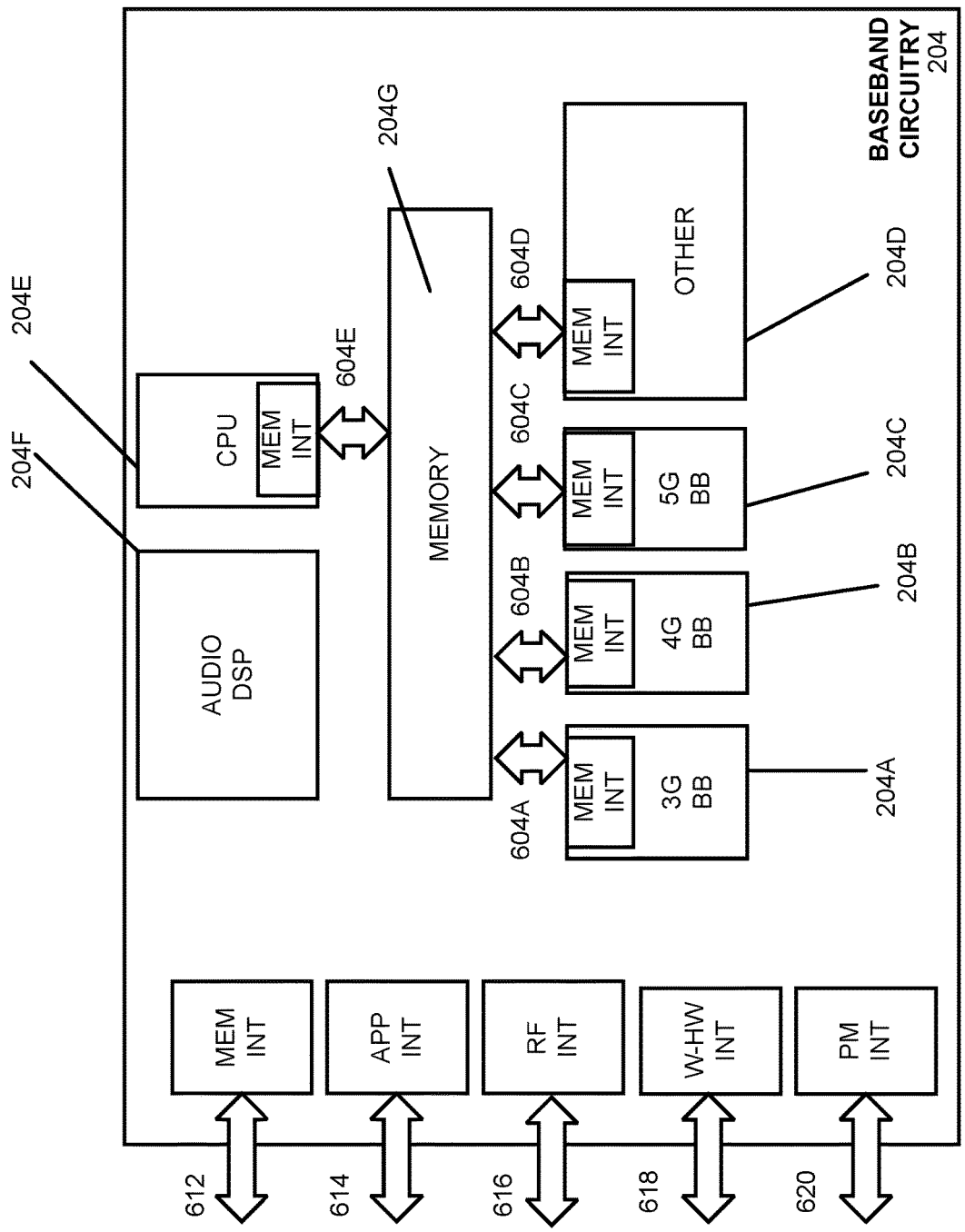
FIG. 6 illustrates example interfaces of baseband circuitry in accordance with various embodiments.

FIG. 6 illustrates example interfaces of baseband circuitry in accordance with some embodiments. As discussed above, the baseband circuitry 204 of FIG. 2 may comprise processors 204A-204E and a memory 204G utilized by said processors. The processors 204A-204E of the UE 105 may perform some or all of the operation flow/algorithmic structure 500, in accordance with various embodiments with respect to the network 300. The processors 204A-204E of the AN 110 may perform some or all of the operation flow/algorithmic structure 505, in accordance with various embodiments with respect to the network 300. Each of the processors 204A-204E may include a memory interface, 604A-604E, respectively, to send/receive data to/from the memory 204G. The processors 204A-204E of the UE 105 may be used to process the SFTD measurement; the processors 204A-204E of the AN 110 may be used to generate the SFTD measurement configuration.

The baseband circuitry 204 may further include one or more interfaces to communicatively couple to other circuitries/devices, such as a memory interface 612 (e.g., an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
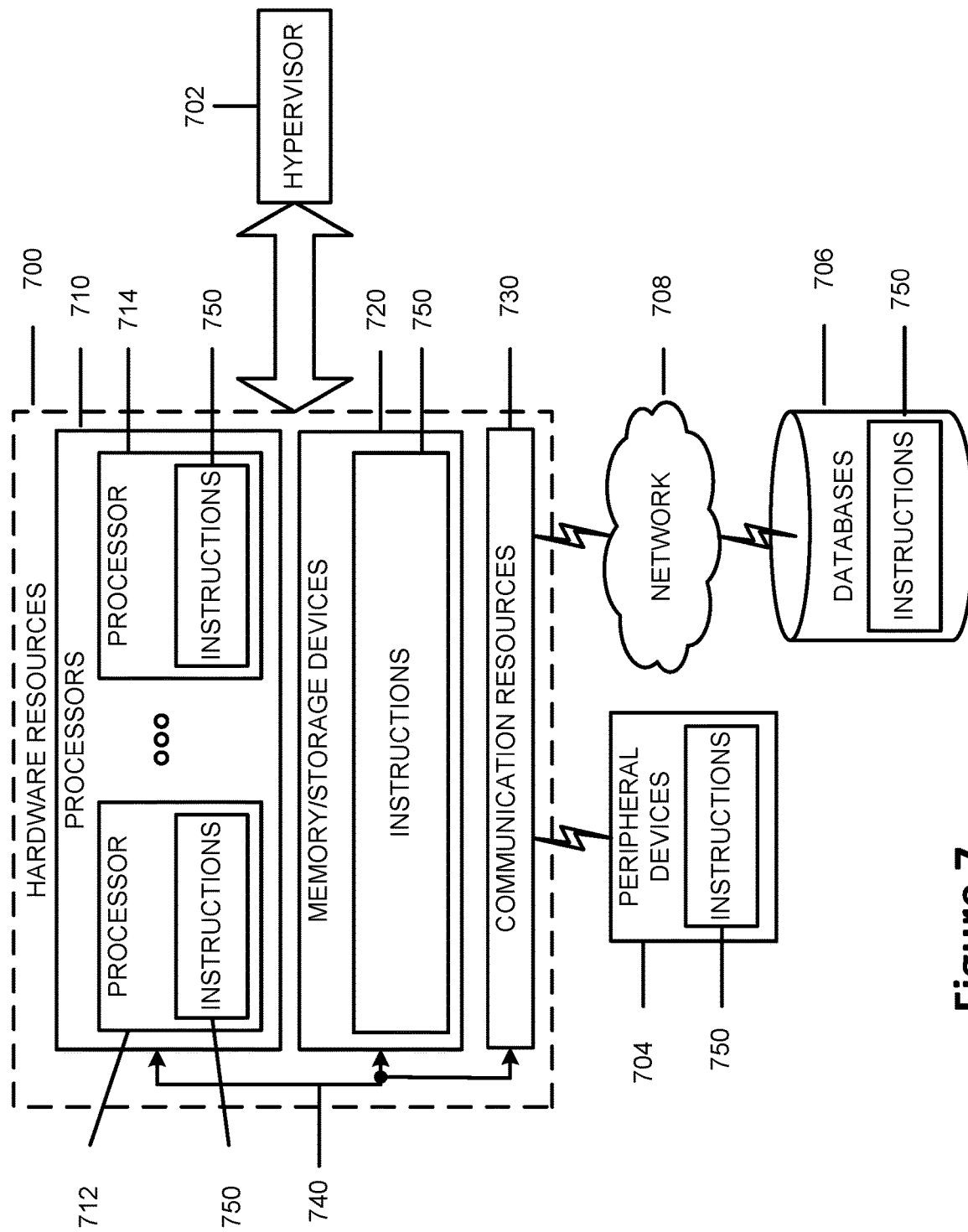
FIG. 7 illustrates hardware resources in accordance with various embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein, e.g., the operation flows 500 and 505. For example, in an embodiment in which the hardware resources 700 are implemented into the UE 105, the instructions 750 may cause the UE to perform some or all of the operation flow/algorithmic structure 500. In other embodiments, the hardware resources 700 may be implemented into the AN 110. The instructions 750 may cause the AN 110 to perform some or all of the operation flow/algorithmic structure 505. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 may include one or more computer-readable media (CRM) comprising instructions to, upon execution of the instructions by one or more processors of a UE, cause the UE to determine a timeline threshold and a power scaling threshold to be used in dynamic power sharing (DPS) between possible long term evolution (LTE) and new radio (NR) uplink signals in a dual uplink evolved universal terrestrial radio access—new radio dual connectivity (EN-DC) network; determine, upon reception of an NR grant for the NR uplink signal, the reception of the NR grant is prior to the timeline threshold or within the timeline threshold; determine respective transmission (TX) power levels for an LTE uplink signal and an NR uplink signal under DPS; and transmit the LTE uplink signal based on the determined TX power level for the LTE uplink signal.

Example 2 may include the one or more CRM of example 1 and/or some other examples herein, wherein, upon execution, the instructions are further to cause the UE to determine a TX power level P_LTE_only for a single LTE uplink transmission under a single uplink operation (SUO) in the EN-DC network; determine a TX power level P_NR_only for a single NR uplink transmission under the SUO in the EN-DC network; and determine a TX power level P_LTE_dual for an LTE uplink signal and a TX power level P_NR_dual for an NR uplink signal under DPS in a dual-uplink transmission of the UE in the EN-DC network.

Example 3 may include the one or more CRM of example 2 and/or some other examples herein, wherein the reception of the NR grant is determined to be received prior to the timeline threshold, and the instructions, upon execution, further cause the UE to determine that a power difference between the P_NR_only and P_NR_dual is less than or equal to the power scaling threshold; transmit the LTE uplink signal at the TX power level P_LTE_dual; and transmit the NR uplink signal at the TX power level P_NR_dual.

Example 4 may include the one or more CRM of example 2 and/or some other examples herein, wherein to determine respective TX power levels for the LTE and NR uplink signals, the instructions further cause the UE to determine that a power difference between the P_NR_only and P_NR_dual is greater than the power scaling threshold; and transmit the LTE uplink signal at the TX power level P_LTE_only.

Example 5 may include the one or more CRM of example 4 and/or some other examples herein, wherein, upon execution, the instructions are further to cause the UE to determine not to transmit the NR signal or to drop the NR signal.

Example 6 may include the one or more CRM of example 4 and/or some other examples herein, wherein the power difference is indicated in decibel (dB) based on a same bandwidth of the NR uplink signal, and the power difference is to indicate a difference between corresponding power spectral densities (PSDs) of the P_NR_only and P_NR_dual.

Example 7 may include the one or more CRM of examples 1-2 and/or some other examples herein, wherein, upon execution, the instructions are further to cause the UE to receive the NR grant for transmitting the NR uplink signal from an access node (AN) of the EN-DC network.

Example 8 may include the one or more CRM of example 7 and/or some other examples herein, wherein, upon execution, the instructions are further to cause the UE to compare a receiving time of the NR grant with the timeline threshold; and determine the receiving time of the NR grant is prior to the timeline threshold after receiving the LTE grant.

Example 9 may include the one or more CRM of examples 1-8 and/or some other examples herein, wherein the timeline threshold is indicated by a number of subframes, a number of slots, or T milliseconds.

Example 10 may include the one or more CRM of examples 1-9 and/or some other examples herein, wherein the timeline threshold is predetermined by the UE or configured by the AN via high-level signaling.

Example 11 may include the one or more CRM of examples 1-9 and/or some other examples herein, wherein, upon execution, the instructions further to cause the UE to decode the power scaling threshold based on reception of a message that indicates the power scaling threshold by an access node (AN) of the EN-DC network.

Example 12 may include the one or more CRM of example 2 and/or some other examples herein, wherein the reception of the NR grant is determined to be received within the timeline threshold, and the instructions further to cause the UE to receive the NR grant for the NR uplink signal, and transmit the LTE uplink signal at a transmission (TX) power level P_LTE_only.

Example 13 may include the one or more CRM of example 12 and/or some other examples herein, wherein, upon execution, the instructions further to cause the UE to determine to drop the NR uplink signal.

Example 14 may include the one or more CRM of examples 1-13 and/or some other examples herein, wherein the dual uplink EN-DC network is an inter-band dual uplink EN-DC or an intra-band dual uplink EN-DC.

Example 15 may include the one or more CRM of examples 1-14 and/or some other examples herein, wherein the dual uplink EN-DC network is to operate with in a frequency range 1 (FR1).

Example 16 may include one or more computer-readable media (CRM) comprising instructions to, upon execution of the instructions by one or more processors of an access node (AN), cause the AN to generate a message that indicates a power scaling threshold to be used in dynamic power sharing (DPS) between possible long term evolution (LTE) and new radio (NR) uplink signals in a dual uplink evolved universal terrestrial radio access—new radio dual connectivity (EN-DC) network; and transmit the message to a user equipment (UE).

Example 17 may include the one or more CRM of example 16 and/or some other examples herein, wherein, upon execution, the instructions further cause the AN to generate an NR grant that is to grant the NR uplink signal in the dual uplink EN-DC; and transmit the NR grant to the UE.

Example 18 may include the one or more CRM of examples 16-17 and/or some other examples herein, wherein, upon execution, the instructions further cause the AN to generate another message that indicates a timeline threshold to be used in DPS between possible LTE and NR uplink signals in the EN-DC network; and transmit the message to the UE.

Example 19 may include the one or more CRM of examples 16-17 and/or some other examples herein, wherein the message is further to indicate a timeline threshold to be used in DPS between possible LTE and NR uplink signals in the EN-DC network; and transmit the message to the UE.

Example 20 may include the one or more CRM of examples 16-19 and/or some other examples herein, wherein the AN is an eNB or ng-eNB.

Example 21 may include one or more non-transitory computer-readable media comprising instructions to cause an electronic device, upon execution of the instructions by one or more processors of the electronic device, to perform one or more elements of a method or CRM described in or related to any of examples 1-20, or any other method or process described herein.

Example 22 may include an apparatus comprising logic, modules, and/or circuitry to perform one or more elements of a method or CRM described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer-readable media comprising instructions that, when executed by the one or more processors, cause the one or more processors to perform the method, techniques, or process as described in or related to any of examples 1-20, or portions thereof, or otherwise described in the present disclosure. The one or more computer-readable media may be one transitory or non-transitory computer-readable media.

Example 25 includes at least one transitory or non-transitory computer-readable storage medium comprising data, wherein the data is to create, manufacture, or otherwise produce instructions, wherein execution of the instructions is to cause a computing device or computing system to perform the method, techniques, or process as described in or related to any of examples 1-20, or portions thereof, or otherwise described in the present disclosure.

Example 26 includes a signal as described in or related to any of examples 1-20, or portions or parts thereof, or otherwise described in the present disclosure.

Example 27 includes a signal in a wireless network as shown and described in the present disclosure, or otherwise described in the present disclosure.

Example 28 includes a method of communicating in a wireless network as shown and described in the present disclosure.

Example 29 includes a system for providing wireless communication as shown and described in the present disclosure.

Example 30 includes a device for providing wireless communication as shown and described in the present disclosure.

Example 31 includes a packet, frame, segment, protocol data unit (PDU), or message as described in or related to any of examples 1-20, or portions or parts thereof, or otherwise described in the present disclosure.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media (CRM) comprising instructions that, upon execution of the instructions by one or more processors of a user equipment (UE), cause the UE to:
   determine a timeline threshold and a power scaling threshold to be used in dynamic power sharing (DPS) between long term evolution (LTE) and new radio (NR) uplink signals in a dual uplink evolved universal terrestrial radio access—new radio dual connectivity (EN-DC) network;
   determine, upon reception of an NR grant for the NR uplink signal, the reception of the NR grant is prior to the timeline threshold;
   determine respective transmission (TX) power levels for the LTE uplink signal and the NR uplink signal under the DPS; and
   transmit the LTE uplink signal based on the determined TX power level for the LTE uplink signal.

2. The one or more non-transitory CRM of claim 1, wherein, upon execution, the instructions further cause the UE to:
   determine a TX power level P_NR_LTE_only for a single LTE uplink transmission under a single uplink operation (SUO) in the EN-DC network;
   determine a TX power level P_NR_only for a single NR uplink transmission under the SUO in the EN-DC network; and
   determine a TX power level P_LTE_dual for an LTE uplink signal and a TX power level P_NR_dual for an NR uplink signal under the DPS in a dual-uplink transmission of the UE in the EN-DC network.

3. The one or more non-transitory CRM of claim 2, wherein to determine respective TX power levels for the LTE and NR uplink signals, the instructions further cause the UE to:
   determine that a power difference between the TX power levels P_NR_only and P_NR_dual is less than or equal to the power scaling threshold;
   transmit the LTE uplink signal at the TX power level P_LTE_dual; and
   transmit the NR uplink signal at the TX power level P_NR_dual.

4. The one or more non-transitory CRM of claim 2, wherein to determine respective TX power levels for the LTE and NR uplink signals, the instructions further cause the UE to:
   determine that a power difference between the TX power levels P_NR_only and P_NR_dual is greater than the power scaling threshold; and
   transmit the LTE uplink signal at the TX power level P_LTE_only.

5. The one or more non-transitory CRM of claim 4, wherein, upon execution, the instructions further cause the UE to determine not to transmit the NR uplink signal.

6. The one or more non-transitory CRM of claim 4, wherein the power difference is indicated in decibel (dB) based on a same bandwidth of the NR uplink signal, and the power difference is to indicate a difference between corresponding power spectral densities (PSDs) of the TX power levels P_NR_only and P_NR_dual.

7. The one or more non-transitory CRM of claim 2, wherein, upon execution, the instructions further cause the UE to receive the NR grant for transmitting the NR uplink signal from an access node (AN) of the EN-DC network.

8. The one or more non-transitory CRM of claim 7, wherein to determine the reception of the NR grant is prior to the timeline threshold, the instructions cause the UE to:
   compare a receiving time of the NR grant with the timeline threshold; and
   determine the receiving time of the NR grant is prior to the timeline threshold after receiving an LTE grant.

9. The one or more non-transitory CRM of claim 1, wherein the timeline threshold is indicated by a number of subframes, a number of slots, or T milliseconds.

10. The one or more non-transitory CRM of claim 1, wherein the timeline threshold is predetermined by the UE.

11. The one or more non-transitory CRM of claim 1, wherein, upon execution, the instructions further cause the UE to decode the power scaling threshold based on reception of a message that indicates the power scaling threshold by an access node (AN) of the EN-DC network.

12. The one or more non-transitory CRM of claim 1, wherein the dual uplink EN-DC network is an inter band dual uplink EN-DC network or an intra-band dual uplink EN-DC network.

13. The one or more non-transitory CRM of claim 1, wherein the dual uplink EN-DC network is to operate within a frequency range 1 (FR1).

14. One or more non-transitory computer-readable media (CRM) comprising instructions that, upon execution of the instructions by one or more processors of an access node (AN), cause the AN to:
   generate a message that indicates a power scaling threshold to be used in dynamic power sharing (DPS) between long term evolution (LTE) and new radio (NR) uplink signals in a dual uplink evolved universal terrestrial radio access—new radio dual connectivity (EN-DC) network;
   transmit the message to a user equipment (UE);
   generate an NR grant that is to grant the NR uplink signal in the dual uplink EN-DC network; and
   transmit the NR grant to the UE,
   wherein the message and the NR grant enable the UE to determine to only transmit the LTE uplink signal, or transmit the LTE uplink signal and the NR uplink signal, based on one or more of a receiving time of the NR grant at the UE, a timeline threshold, and the power scaling threshold.

15. A user equipment (UE), comprising:
   a central processing unit (CPU) configured to:
      determine a timeline threshold to be used in dynamic power sharing (DPS) between long term evolution (LTE) and new radio (NR) uplink signals in a dual uplink evolved universal terrestrial radio access—new radio dual connectivity (EN-DC) network, and
      determine, upon reception of an NR grant for the NR uplink signal, the reception of the NR grant is within the timeline threshold; and
   one or more baseband processors coupled with the CPU, the one or more baseband processors configured to:
      receive the NR grant for the NR uplink signal, and
      transmit the LTE uplink signal at a transmission (TX) power level P_LTE_only.

16. The UE of claim 15, wherein the CPU is further configured to determine the TX power level P_LTE_only for a single LTE uplink transmission under a single uplink operation (SUO) in the EN-DC network.

17. The UE of claim 15, wherein the timeline threshold is indicated by a number of subframes, a number of slots, or T milliseconds.

18. The UE of claim 17, wherein the CPU is further configured to determine to drop the NR uplink signal.

19. The UE of claim 15, wherein the CPU is further configured to predetermine the timeline threshold.

20. The UE of claim 15, wherein the CPU is further configured to compare a receiving time of the NR grant with the timeline threshold to determine that the reception of the NR grant is within the timeline threshold.

* * * * *